UNITED STATES PATENT OFFICE.

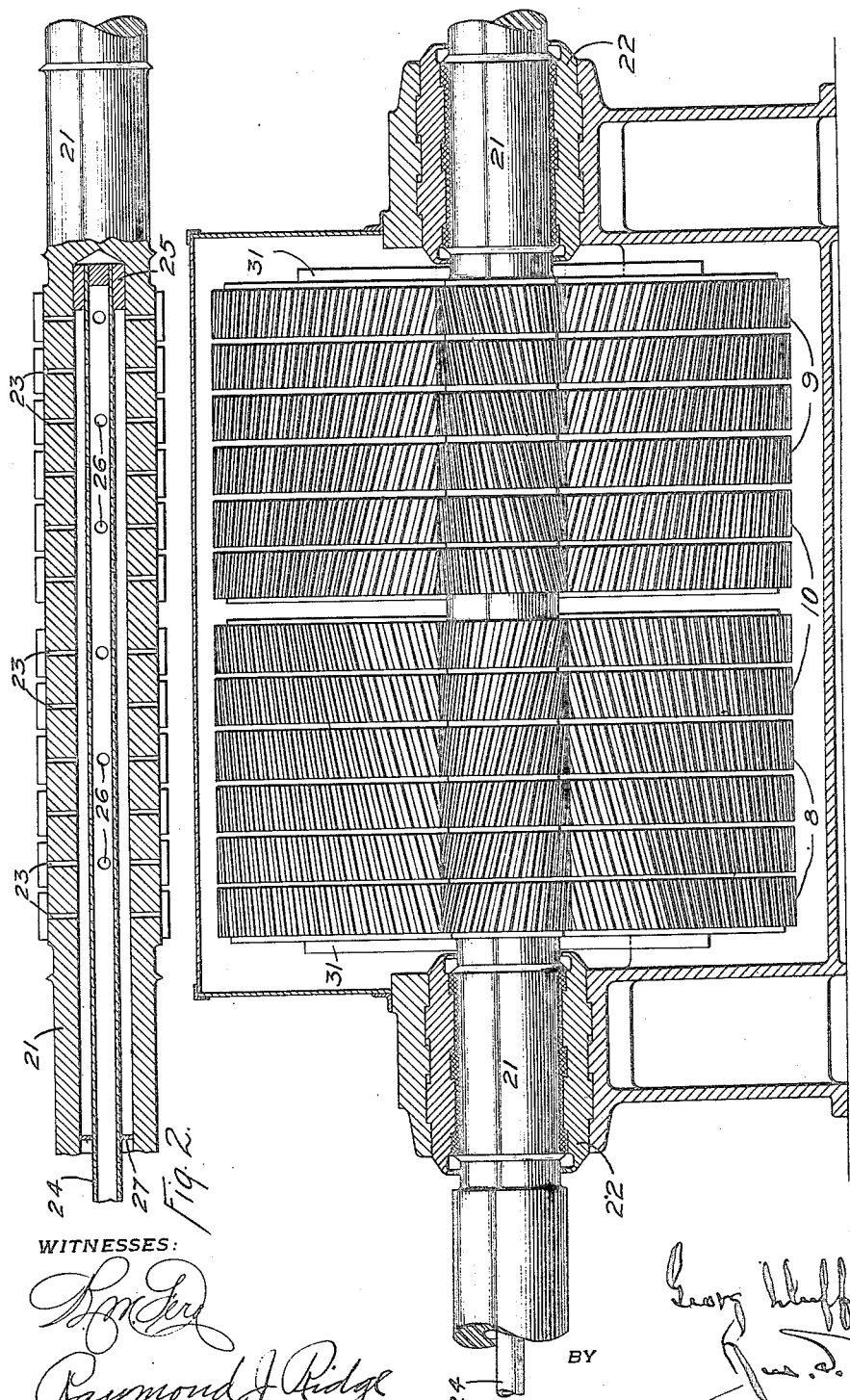

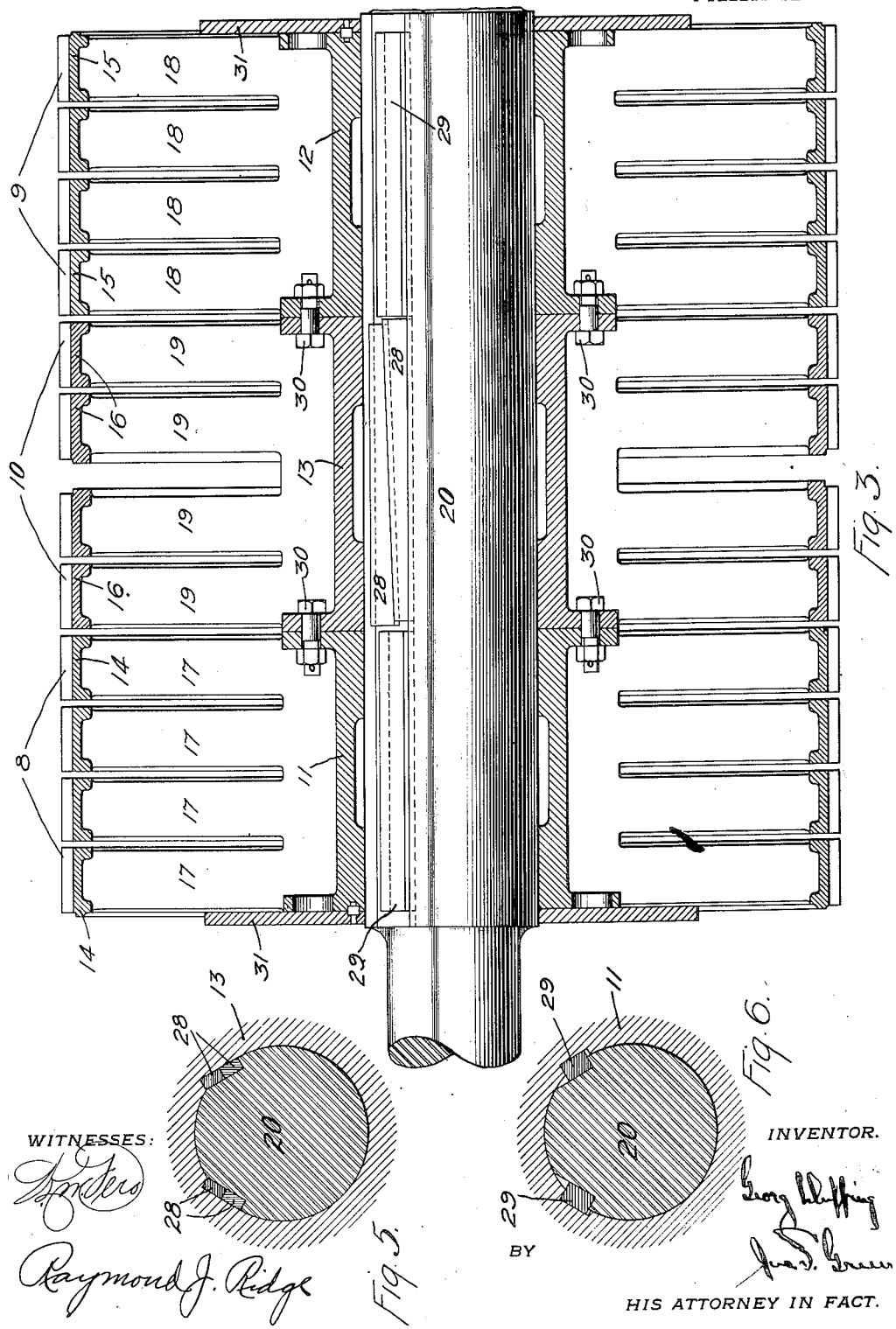

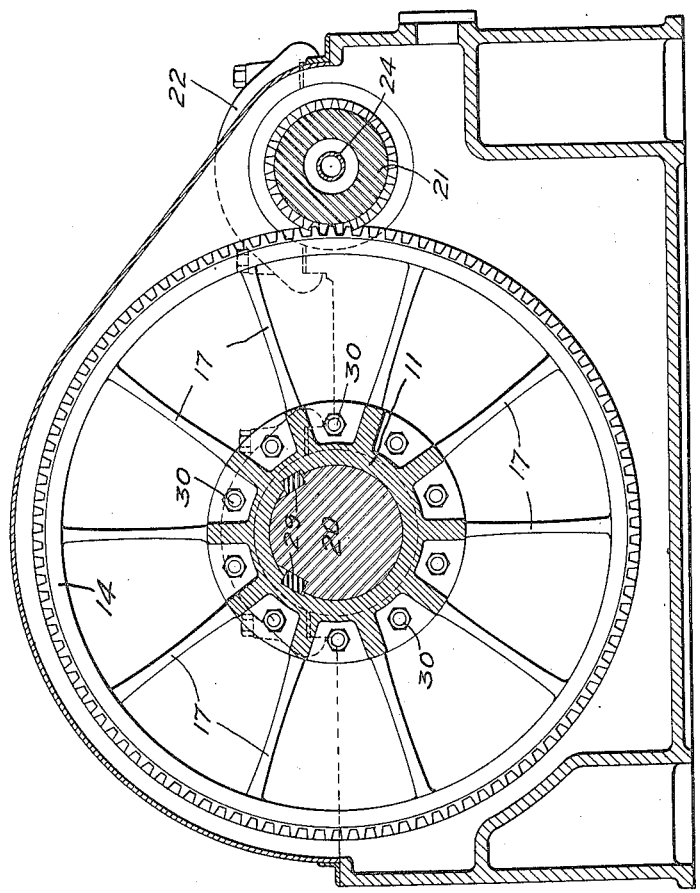

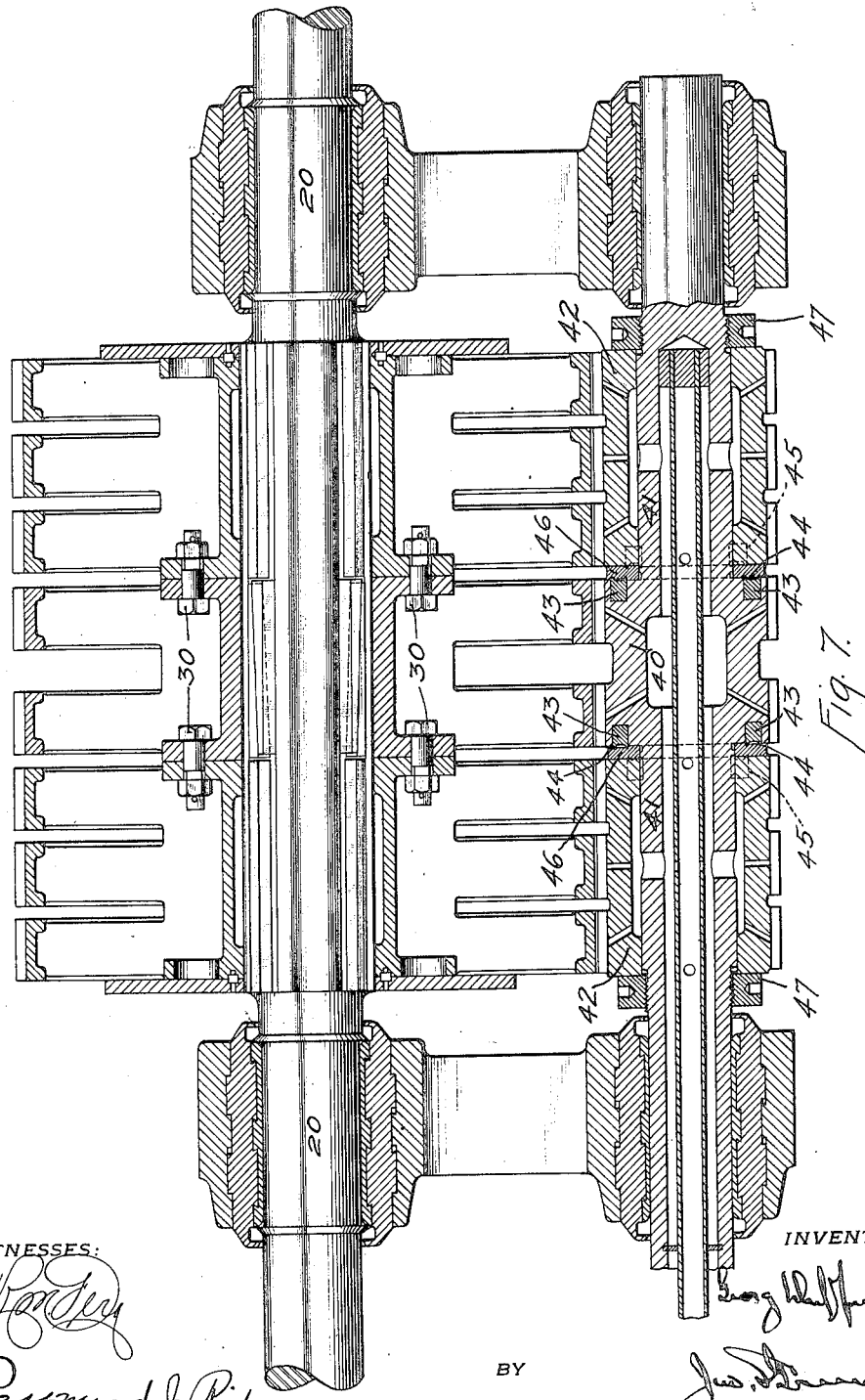

GEORG DUFFING, OF COLOGNE, GERMANY.

REDUCTION-GEARING.

1,070,589.

Specification of Letters Patent. Patented Aug. 19, 1913.

Application filed October 1, 1910. Serial No. 584,850.

*To all whom it may concern:*

Be it known that I, GEORG DUFFING, a subject of the Emperor of Germany, and a resident of Cologne, Germany, have made a new and useful Invention in Reduction-Gearing, of which the following is a specification.

This invention relates to reduction gearing and more particularly to such gearing for transmitting relatively large powers from high speed motors such as turbines to apparatus to be run at lower speeds, such for instance as the propeller shafts of ships.

An object of this invention is the production of reduction gearing in which the tooth pressures are automatically and uniformly, or substantially uniformly, distributed.

A further object is the production of such a reduction gearing without back-lash.

These as well as other objects which will readily appear to those skilled in this art, I attain in the gearing described in the specification and illustrated in the drawings accompanying the same, forming a part of this application and throughout which the several elements are denoted by like characters.

In the drawings: Figure 1 is a view in longitudinal elevation of a reduction gearing embodying this invention; Fig. 2 is a longitudinal section of the pinion member of such gearing; Fig. 3 is a longitudinal section of the gear member of such gearing; Fig. 4 is a cross-sectional view of the gearing illustrated in Fig. 1; Figs. 5 and 6 are views illustrating the keys utilized in the gear member; and Fig. 7 is a longitudinal section in plan of a modified form of this invention.

Broadly this invention consists in dividing up one of the gears of a transmission gearing into a number of transverse sections provided with elastic spokes or bodies whereby circumferential displacement of the several sections due to the elasticity of the spokes or bodies, is permitted so that a uniform distribution of tooth pressures is automatically accomplished.

For the purpose of fully illustrating this invention but with no idea of limiting the same to specific details, the same is shown as applied to a spur gear in which the gear and pinion members are provided with reversely arranged spiral teeth as in the ordinary forms of herringbone gearing.

In the device of Figs. 1 to 6 inclusive the gear member is divided transversely to the teeth into twelve sections 8, 9 and 10, there being four sections numbered 8, four sections numbered 9 and four sections numbered 10. The sections 8 and 9 are the load-carrying sections, while the sections 10 are the back-lash preventing sections. Each of the sections 8, 9 and 10 is made up of a single casting comprising a hub portion, a rim portion and ten spokes joining the hub and rim portions. The hub portions of the several castings are numbered 11, 12 and 13 respectively, the rim portions are numbered 14, 15 and 16 respectively, while the spokes are numbered 17, 18 and 19 respectively. The several castings are mounted on a shaft 20 and bolted together, as hereinafter described.

The pinion member which consists of a hollow shaft 21 provided with oppositely arranged spiral teeth meshes with the gear member. The shaft 20 which is journaled in suitable bearings (not shown) is adapted to be connected to the apparatus to be driven, such for instance as the propeller shaft of a ship, and shaft 21 of the pinion member which is journaled in suitable bearings 22 is adapted, by means of any suitable flexible coupling, (not shown) to be connected to the driving apparatus such as a turbine or high speed motor, the speed of which it is desired to reduce.

As there will be more or less longitudinal or endwise relative play between the gear and pinion, the pinion member is machined as shown in Fig. 1 into transverse sections corresponding to the sections of the gear member. This is done in order to prevent the formation of ridges in the pinion member which would necessarily form as the gear members become worn due to the spaces in the gear member between the sections.

For the purpose of lubricating the gearing, the pinion member is provided with a hollow shaft and between its teeth holes 23 are drilled into the interior of the shaft. A hole is provided for each sectional tooth and these holes are preferably staggered so as not to weaken the pinion. Within the hollow shaft an oil pipe or tube 24 is located and is loosely guided by means of a spacer 25. The inner end of this tube is plugged and oil outlet holes 26 are provided along the length of the tube. An annular guard 27 is located near the end of the shaft and, when in operation, oil is fed to the interior of the shaft through the tube which, on account of the centrifugal force, forms an oil annulus within the shaft retained by guard 27 and caused to pass out through openings 23, thus lubricating the teeth of the gearing.

In assembling the gearing the central casting of the gear member, which is provided with sections 10, is rigidly keyed to shaft 20 by two sets of tapered tangential wedges 28. The two portions which are provided with sections 8 and 9 are then keyed to shaft 20 by means of straight tangential wedges 29 separated a certain distance from the central section. The gear member and the pinion are then mounted within their bearings and the teeth of the load-carrying sections are placed in contact with the forward flanks of the pinion teeth while the teeth of the central section are placed in contact with the rear flanks of the pinion teeth, then the outer portions of the gear member comprising sections 8 and 9 are drawn up to the central section by means of bolts 30. On account of the inclination of the teeth, when these two outer portions are drawn up to the central portion, the spokes 17 and 18 will be sprung in opposition to the spokes 19, thereby bracing the load-carrying sections against the back-lash preventing section. In this manner the play of the teeth within the tooth spaces is taken up and back lash prevented.

The straight keys 29 are held in place by means of end plates 31 which are bolted to the end portions and which may be drilled as is now common and serve as balancing plates for the gear member. This is desirable as it is preferable to cast the three portions of the gears which necessitates correct balancing after the gear member is machined.

After the gearing has become worn and therefore the tension of the load sections and back-lash-preventing-section diminished, proper tension may again be restored by loosening bolts 30 moving the two outer or load-carrying sections away from the central section the necessary amount, inserting new and larger keys and again drawing up the outer sections to the central sections by means of bolts 30. With this construction when the gears are new there will be a point contact for each section as against only two point contacts at the opposite ends of the teeth in relatively long gears where the gears are formed solid as is now customary. The breadth of each section should be chosen as small as practicable. Where spiral or inclined teeth are used the breadth of the sections is governed by the lateral pressure exerted on the spokes due to the inclination of the teeth. Where straight teeth are used this lateral pressure does not exist and the sections can be made narrower than with oblique or spiral teeth. The increase of tooth pressure, due to the tension exerted by the back-lash section could be looked upon as a draw back of this form of gearing but experience has shown that such an increase in pressure is not detrimental because it eliminates the back-lash and consequently the shocks due thereto which are more harmful than the additional tooth friction occasioned by such pressure.

In the modification shown in Fig. 7 the gear member is shown made up of three portions bolted together by means of bolts 30 merely for the purpose of manufacturing. After these are bolted together the member as a whole is keyed in any suitable manner to the shaft 20 and the tension on the central section is brought about in the following manner: The pinion member is formed with a central section 40 corresponding with the central section of the gear member. Either side of the central section the pinion shaft is reduced as at 41 and onto this a sleeve 42 is mounted. In each of these sleeves 42 teeth are cut corresponding to the teeth of the two outer portions of the gear member. The end faces of the central section 40 of the pinion are drilled and into the holes thus formed hardened steel pins 43 are placed. The outer ends of these pins are cupped to form a sharp rim 44. The inner end faces of the two sleeves 42 are drilled in a similar manner and similar hardened steel pins 45 are inserted in the holes in these end faces. Between the outer end faces of the central portion of the pinion and the inner end faces of the outer portions a soft steel ring 46 is interposed. After the pinion and gear are in mesh the proper tension for taking up the back lash is accomplished by turning the two sleeves 42, the teeth of which are in mesh with the teeth of the gear, on the shaft 41 so that the teeth of the sleeves contact with the forward flanks of the teeth of the gear while the teeth of the middle section of the pinion contact with the rear flanks of the teeth of the gear. This turning may be carried out until the proper tension is obtained and then in order to maintain this tension the sleeves 42 are forced along the pinion shaft until the pins 45 and 43 bite into the soft steel washers. This forcing along the pinion shaft is accomplished by means of nuts 47 threaded onto the pinion shaft which lock the sleeves in place. When wear has taken place in the teeth of the gear or pinion, or both, so that the proper tension is diminished, it may again be attained by loosening up nuts 47, backing the sleeves 42 away from the soft steel washers and after obtaining the proper tension by turning the sleeves on the shaft, again securing them in place by means of the nuts 47.

Having thus described my invention, what I claim is:

1. A pair of coöperating gears, one of which is composed of a number of spoked sections independently yieldable transversely to their axes due to the elastic construction of the spokes.

2. A pair of coöperating gears, one of which is composed of a number of spoked sections independently yieldable transversely to their axes, due to the elasticity of said spokes.

3. A pair of coöperating gears, one of which is composed of a number of sections independently yieldable transversely to their axes and means for causing one or more of said sections to take up back lash.

4. A pair of coöperating gears, one of which is composed of a number of spoked sections independently yieldable transversely to their axes and means for causing one or more of such sections to yieldingly contact with the opposite flanks of the teeth of the coöperating gear from the remainder.

5. A pair of coöperating gears, one of which is composed of a number of sections independently yieldable transversely to their axes and means for causing one or more of the central sections to yieldingly contact with the rear flanks of the teeth of the coöperating gear.

6. A pair of coöperating gears one of which consists of a number of elastically spoked, independently yielding elements, the resistance to yielding of any one of said elements being less, and the resistance of all combined being greater, than the force transmitted by the gear whereby uniform pressure over contacting surfaces of the gear teeth is obtained.

7. A gear wheel having the active portions of its teeth composed of a number of elastically spoked elements arranged side by side and movable independently in the direction of power transmission whereby an even and uniform bearing on a complemental gear may be obtained.

8. A gear wheel having the active portions of its teeth composed of a number of elastically spoked elements arranged side by side and movable independently in the direction of power transmission and capable of resisting such motion with a force which is less for each individual element than the power delivered to or from the entire gear whereby the teeth are enabled to yield locally to obtain an even bearing on the teeth of a gear in mesh therewith.

9. The combination of driving and driven gears one of which is composed of a number of elastically spoked sections arranged side by side so that one or all of said sections may give way locally whereby the tooth pressure of the gears may be equalized.

In testimony whereof, I have hereunto subscribed my name this 2nd day of August, 1910.

GEORG DUFFING.

Witnesses:
B. B. Hines,
Jno. S. Green.